May 28, 1968  R. S. JAY  3,385,238
MOBILE ELEVATING TABLE
Filed Sept. 28, 1966  2 Sheets-Sheet 1
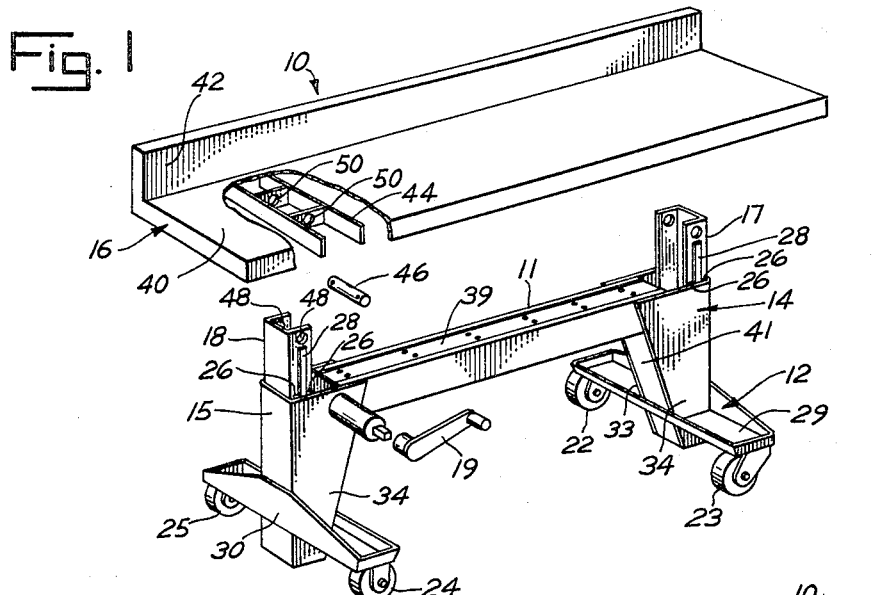
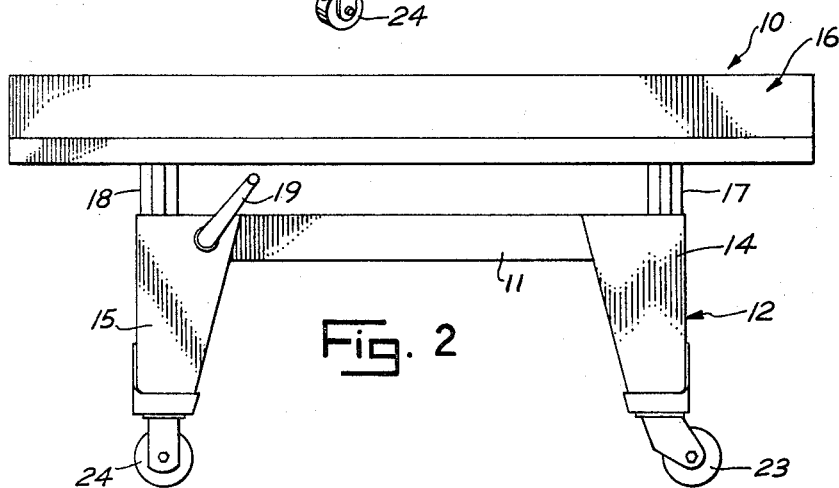
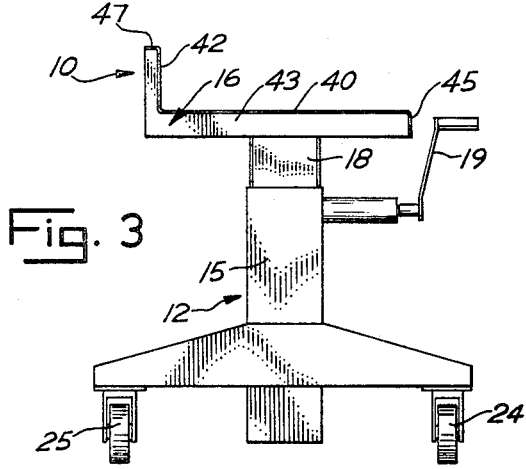
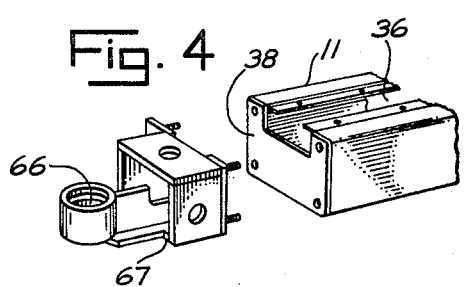
INVENTOR.
RICHARD S. JAY
BY Dominik, Stein & Knechtel
ATTORNEYS May 28, 1968   R. S. JAY   3,385,238
MOBILE ELEVATING TABLE
Filed Sept. 28, 1966   2 Sheets-Sheet 2
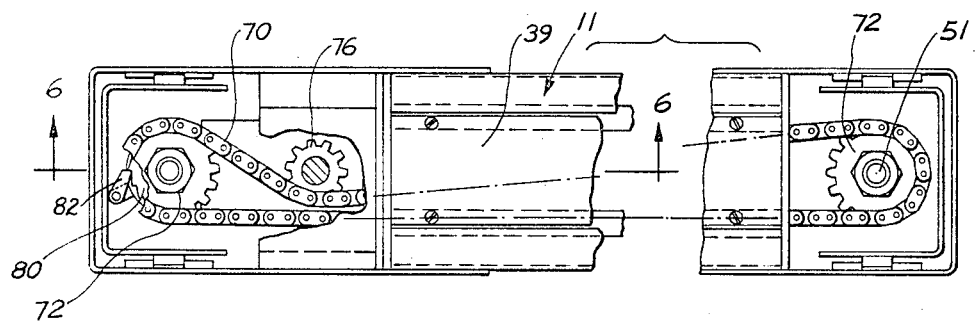
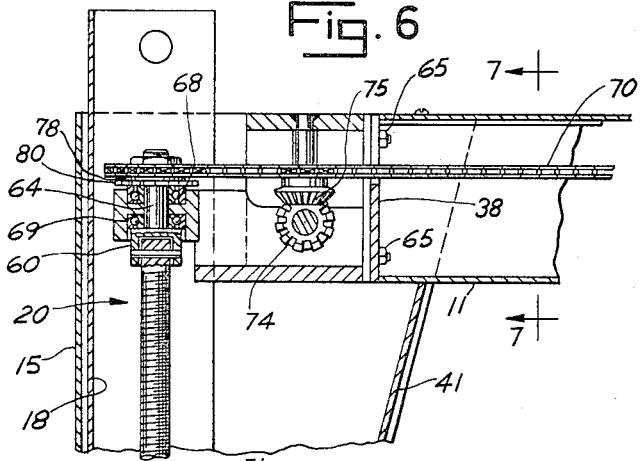
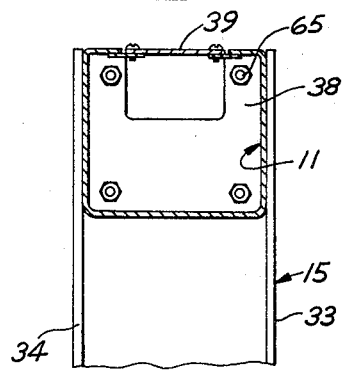
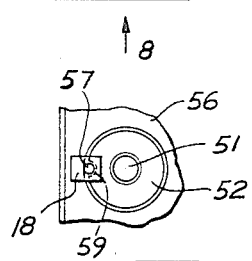
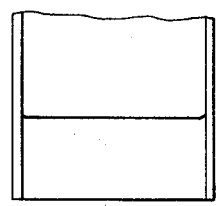
INVENTOR.
RICHARD S. JAY
BY Dominik, Stein & Knechtel
ATTORNEYS

United States Patent Office 3,385,238
Patented May 28, 1968

3,385,238
MOBILE ELEVATING TABLE
Richard S. Jay, Evanston, Ill., assignor to Jarke Corporation, Chicago, Ill., a corporation of Illinois
Filed Sept. 28, 1966, Ser. No. 582,598
8 Claims. (Cl. 108—147)

ABSTRACT OF THE DISCLOSURE

A mobile elevating table including, generally, a base having a pair of spaced apart, vertically disposed pedestals in which a pair of support columns, which are affixed to the table top, are slidably retained. Caster support assemblies are also affixed to the base, for permitting one man to easily and safely maneuver a full load of material. A ball-screw and nut assembly is retained in each of the pedestals, to vertically elevate the support columns, and hence the table top. The ball-screw drive minimizes the effort required to manually elevate loads, by means of a hand crank, and a friction disc is interposed within the ball-screw drive so as to prevent the load from free-falling or back driving the crank.

---

This invention relates in general to mobile elevating tables, and in particular, to mobile elevating tables which are adapted for use in handling, transporting, elevating and feeding of materials such as metal strips and bar stock to punch presses, shears, screw machines and the like.

Elevating tables of the subject type are used in various plants and factories to simplify and speed up the handling, transporting and feeding of materials to punch presses, shears, screw machines and the like. These tables save time and labor, and hence, reduce manufacturing costs, by eliminating extra handling of the materials. The material is simply loaded on the elevating table, rolled to the machines and fed directly from the table to the machines. No unloading or transferring of the material is necessary. Generally, the shelf top of the tables can be raised or lowered and tilted to various angles, to suit feed requirements. The tables also are mounted on free-rolling casters so that one man can easily and safely maneuver a full load wherever desired.

Accordingly, an object of the present invention is to provide improved mobile elevating tables. More particularly, an object is to provide improved elevating tables adapted for use for handling materials such as metal strips and bar stock to punch presses, shears, screw machines and the like.

Another object is to provide improved mobile elevating tables having a construction which integrates the structural and functional elements, using heavy gauge sheet steel or light plate forms joined by welding, to provide a structure which is sturdy and virtually maintenance free.

Still another object is to provide improved elevating tables having a construction whereby a closure against dirt and protection for the internal operating mechanism is provided.

A still further object is to provide improved elevating tables having a driving or lifting mechanism which minimizes the effort required to elevate loads by manual means.

Still another object is to provide improved elevating tables having a drive or lifting mechanism which is designed to prevent the load from free-falling or back driving the manual operating means. In this respect, it is contemplated that lowering of a load can be accomplished only by reversely operating the manual operating means, with only an amount of torque sufficient to overcome a provided locking torque.

A still further object is to provide improved mobile elevating tables which have a skin-stressed monocoque design, providing enclosed smoothly wrapped contours that lend both a safety feature and eye appeal to the tables.

Other objects of the invention will in part be obvious and will in part appear hereinafter.

The above objectives are accomplished by providing a mobile elevating table including, generally, a base having a pair of spaced apart, vertically disposed pedestals in which a pair of support columns, which are affixed to the table top, are slidably retained. Caster support assemblies are also affixed to the base, for permitting one man to easily and safely maneuver a full load of material. A ball-screw and nut assembly is retained in each of the pedestals, to vertically elevate the support columns, and hence the table top. The ball-screw drive minimizes the effort required to manually elevate loads, by means of a hand crank, and a friction disc is interposed within the ball-screw drive so as to prevent the load from free-falling or back driving the crank. Lowering of a load can be accomplished only by counter rotation of the crank, using only that amount of torque required to overcome the locking torque. The overall construction of the elevating table is such as to integrate the structural and functional elements, in a fashion such as to provide a safe, sturdy table, with eye appeal.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view partially exploded and partially broken away, of a mobile elevating table, exemplary of the invention;

FIG. 2 is a side plan view of the elevating table of FIG. 1;

FIG. 3 is an end plan view of the elevating table of FIG. 1;

FIG. 4 is an exploded perspective view illustrating the manner in which the vertical pedestal member and the horizontal strut are assembled and affixed to the ball-screw drive;

FIG. 5 is a top plan view, partially broken away and partially sectionalized, of the base unit of the elevating table, illustrating the driving assembly;

FIG. 6 is a partial sectionalized view taken along lines 6—6 of FIG. 5, illustrating the ball-screw and nut assembly within one of the pedestals and its driving arrangement;

FIG. 7 is an end plan view, illustrating the structure of the horizontal strut, at its one end; and FIG. 8 is a partial view of the bottom of one of the pedestals, illustrating the manner in which the ball-nuts are affixed to the columns.

Similar reference characters refer to similar parts throughout the several views of the drawings.

Referring now to the drawings, and particularly FIGS. 1–3 thereof, a mobile elevating table 10 exemplary of the invention including a base 12 having a pair of vertically disposed pedestals 14 and 15 which are affixed in spaced relation to one another by means of a horizontal strut 11, a table top 16, and a pair of support columns 17 and 18 which are affixed to the underside of the table top 16 and slidably and adjustably retained within respective ones of the pedestals 14 and 15. A ball-screw drive 20 (FIG. 6) is retained in each of the pedestals 14 and 15 and is operated by means of a hand crank 19, to raise and lower the table top 16. Free-rolling casters 22–25 are also affixed to the base 12, for permitting one man to easily and safely maneuver a full load wherever desired. Floor locks (not shown) also can be provided, if desired, to prevent the table 10 from being moved about on the casters 22–25 once the table is positioned.

The construction of the mobile elevating table 10 aims at integrating the structural and functional elements, using heavy gauge sheet steel or light plate forms joined by welding, as described more fully below. For example, the pedestals 14 and 15 each formed of a heavy gauge sheet steel which is press-formed to form a U-shaped channel having flanges or side walls 33 and 34. The edges of the flanges 33 and 34 taper inwardly from the top to the bottom, and the smaller ends of the pedestals 14 and 15 are extended through apertures (not shown) formed in a pair of caster supports 29 and 30. The pedestals and the caster supports are welded together.

The strut 11 also is press-formed to provide a substantially rectangular-shaped box-like structure having an opening 36 at the top. The ends of the strut 11 are welded between the flanges 33 and 34 of the pedestals 14 and 15, as illustrated. A plate 38 (FIG. 4) is welded or bolted to each of the open ends of the strut 11, and a cover plate 39 is affixed in a similar fashion across the opening 36, to form a closure against dirt and to protect the internally contained drive mechanism. A plate 41 (FIGS. 1 and 6) is likewise affixed across the open end of the flanges 33 and 34 of each of the pedestals 14 and 15, to provide a closure. The plates 38–41 also add torsional stiffness to the entire structure so that a strong, rigid structure is provided. The caster supports 29 and 30 are of sufficient width to steadily support the elevating table 10, and the casters 22–25 are affixed to them so as to be rotatable and turnable, in the well-known manner.

The table top 16 is formed substantially L-shaped of heavy gauge sheet steel and has a horizontally disposed bed 40 and a shorter vertically disposed backstop 42. The ends of the bed 40 and backstop 42 are folded or bent at right angles to form flanges 45 and 47, and end plates 43 are welded to each of the opposite ends of the table top 16, to provide both rigidity and a finished appearance to the table top.

A pair of support column brackets 44 are fixedly secured to the underside of the bed 40 of the table top 16, so as to be concealed beneath the bed. The brackets 44 each are adapted to retain the upper end of one of the support columns 17 and 18, by means of a pin 46 extended through apertures 48 formed in the support columns and apertures 50 formed in the brackets. When assembled, the ends of the support columns 17 and 18 abut against the underside of the table top 16, to thereby add rigidity to the structure.

The support columns 17 and 18 are slidably and adjustably received within the U-shaped channels formed by the arms 33 and 34 of the respective pedestals 14 and 15. The support columns 17 and 18 are maintained in vertical alignment within the pedestals, by means of a pair of alignment bars 28. The alignment bars 28 are affixed to the opposite sides of the support columns and each of them is adapted to be slidably and fixedly retained between a pair of guide bars 26 affixed to the arms of the pedestals. The alignment bars 28 and the guide bars 26 may be secured to the support columns and to the pedestals, respectively, in any suitable manner such as by plug welding them.

Vertical travel of the support columns 17 and 18, hence the table top 16, is provided by the ball-screw and nut assemblies which are affixed within each of the pedestals 14 and 15. This can be best seen in FIGS. 5 and 6. The lower end of a ball-screw 51 is received within a ball-nut 52 which has ball bearings 53 therein, for threadedly receiving the ball-screw 51, in the well-known manner. The ball-nut 52 extends through an aperture (not shown) in a plate 56 which is affixed to the support column 18, and is threaded into a swivel plate 54. The swivel plate 54 abuts against the underside of the plate 56 and supports the vertical thrust of the support column 18. A threaded screw or drive pin 57 engages a slot 59 in the swivel plate 54 to restrict rotation without inhibiting radial abutment. A locking plate 58 retained by the drive pin 57 holds the swivel plate in abutting relationship with the plate 56.

The upper end of the ball-screw 51 is coupled to and suspended from a drive spindle 60, by means of a pin 62 (not shown) extended through a flared aperture (not shown) formed through its diameter at its top end and apertures not shown) formed in the drive spindle 60. A shaft 64 of the drive spindle 60 extends through an aperture 66 (FIG. 4) of a drive spindle support 67 which is fixedly secured by means of threaded nuts and bolts 65 (FIGS. 6 and 7) to the plate 38 affixed to the end of the horizontal strut 11. A pair of bearing races 68 and 69 held in spaced relation by flange 71 within the apertures 66 rotatably support the shaft 64 of the drive spindle 60.

The ball-screw and nut assembly 20 in the pedestal 14 is identical to that described above, and the two assemblies are drivingly coupled to one another by means of a chain 70. The chain 70 extends about sprockets 72 keyed to the ball-screws 51 and through the drive spindle supports 67 and the horizontal strut 11. The supports 67 and the strut 11 are accordingly formed so that the chain can be freely extended through them and, as indicated above, a plate 39 is affixed over the opening 36 in the strut to provide a closure and to protect the chain from damage.

The chain 70 is driven to operate the ball-screw and nut assemblies 20, by means of a pair of mitered gears 74 and 75 rotatably supported within the drive spindle support 66 affixed to the left end (as illustrated) of the strut 11. The gears 74 and 75 could as well be retained within the opposite drive spindle support 67, and the gears 74 and 75 and the drive spindle support 67 can be assembled as a unit before installation.

The gear 74 is affixed to the end of the crank 19 so as to be rotated by it, and is drivingly coupled with the gear 75. The gear 75 also has gear cogs 76 (FIG. 5) formed about its upper end, which cogs are drivingly engaged with the drive chain 70.

The loading on the ball-screw 51 is tensile and thus the ball-screw is kept generally straight in vertical alignment. Some degree of eccentricity is provided for by the flared aperture in which the pin 62 is received for coupling the ball-screw 51 to the drive spindle 60, thereby freeing rotation of the ball-screw from constraining moments or binding forces. This arrangement further permits the relatively simple use of the guide bars 26 within the pedestals 14 and 15, for maintaining vertical alignment of the support columns 17 and 18. A tight axial alignment of the ball-screw 51 would require a costly machine fit between the support columns and the pedestals, hence the described arrangement provides substantial economic advantages.

The ball-screw and nut assemblies 20 minimize the effort required to elevate loads on the table top 16 by manual means such as the crank 19. The assemblies 20 permit loads as much as 5,000 pounds to be elevated, with the lowest possible mechanical advantage, so that positioning can be accomplished easily and quickly. The high efficiency of the ball-screw and nut assemblies make this possible.

The same efficiency, however, permits the table top 16 to free-fall when loaded and back drive the crank 19. To prevent this, a friction disc 78 is interposed between the drive sprockets 72 and a ratchet wheel 80 (FIG. 5). During the lift cycle, the friction disc 78 rotates in frictional combination with the drive sprocket 72, the ratchet wheel 80 and the upper bearing race 68. A pawl 82 is provided to lock the ratchet wheel 80 against counterclockwise (as illustrated) rotation.

Lowering of the ball-screws 51 and hence the table top 16 is accomplished by rotating the crank 19 in a counterclockwise direction with sufficient force to overcome the frictional locking torque of the friction disc 78. The locking torque is proportioned to prevent free-fall and to provide an additional safety factor.

The friction disc 78 is formed of a material or a combination of materials in which the static and dynamic coefficients of friction are nearly alike. This avoids the "breakaway" torque developed in most friction materials. Also, most friction materials require a static start two to three times the value of the running effort, and this is of particular concern in manually operated equipment. Accordingly, the friction disc 78 is preferably formed of plastics of the tetrafluoroethylene formulations which exhibit frictional characteristics wherein the static and dynamic coefficients of friction are nearly alike.

While not illustrated, the table top 16 can be made adjustable so that it can be tilted up to angles of approximately 45° to meet varying feed requirements. This may be easily accomplished by affixing the brackets 44 to the table top 16 in a fashion so as to be angularly adjustable or, alternatively, any other suitable arrangement can be used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An elevating table comprising, in combination: a table top; a pair of support columns affixed to said table top in spaced relation and depending substantially vertically downwardly beneath said table top; a base having a pair of vertically disposed pedestals adapted to slidably receive said support columns therein, alignment means affixed to said support columns and to said pedestals for maintaining said support columns in vertical alignment; a high efficiency drive assembly in each of said pedestals and affixed to said support columns for vertically adjusting the height thereof; means for operating said assemblies; and friction disc included within each of said drive assemblies for preventing said table top from free-falling when loaded.

2. The elevating table of claim 1 wherein said table top is formed of heavy gauge sheet steel which is formed substantially L-shaped so as to provide a horizontally disposed bed portion and a vertically disposed support along one end thereof, the edges of said bed portion and said support being folded to form a flange, and a cover plate affixed to the opposite ends of said table so as to provide a solid appearance and to add rigidity to said table top.

3. The elevating table of claim 1 wherein said pedestals each are formed of a single sheet of material which is folded substantially U-shaped so as to form a cavity therein for receiving a portion of said drive assemblies, the side walls of said pedestals each being angularly tapered inwardly from the top to the bottom thereof and having a closure plate affixed thereto so as to close said cavity therebetween to conceal said drive assemblies therein, and wherein said base further includes a horizontally disposed box-like strut, the ends thereof being affixed between said side walls of said pedestals, said strut having a portion of the operating means for said drive assemblies retained and protectively concealed therein.

4. The elevating table of claim 1 wherein said alignment means comprise alignment bars affixed respectively to the opposite sides of each of said support columns and pairs of guide bars affixed to said pedestals so as to slidably receive respective ones of said alignment bars therebetween.

5. The elevating table of claim 1 wherein said drive assemblies each comprise a ball-screw and nut assembly, the ball-nuts thereof being coupled to said support columns and the ball-screw thereof being vertically supported and retained within said pedestals, whereby upon rotation of said ball-screws to thread them into and through said ball-nuts the position of said support columns are vertically adjusted, means drivingly coupling said ball-screw and nut assemblies to one another, and drive means coupled to said coupling means, said ball-screw and nut assemblies being simultaneously operated upon operation of said drive means to vertically adjust the position of said support columns, said frictional means being included within said ball-screw and nut assembly.

6. The elevating table of claim 5 further including a sprocket drivingly affixed to each of said ball-screws, and a ratchet wheel coupled to each of said ball-screws for lockingly engaging said ball-screws against rotation in one direction, and wherein said coupling means comprises a chain drive looped about said sprockets, and said drive means comprise gear means drivingly engaged with said chain and a hand crank which is affixed to said gear means to operate said gear means.

7. The elevating table of claim 6 wherein said frictional means comprises a friction disc interposed between each of said sprockets and said ratchet wheels so as to provide sufficient locking torque to prevent free-fall and to provide a safety margin, said friction discs having static and dynamic friction characteristics which are substantially the same.

8. An elevating table comprising, in combination: a table top formed of heavy gauged sheet steel which is formed substantially L-shaped so as to provide a horizontally disposed bed portion and a vertically disposed support along one end thereof, the edges of said bed portion and said support being folded to form a flange, and a cover plate affixed to the opposite ends of said table so as to provide a solid appearance and to add rigidity to said table top; a pair of support columns affixed to said table top in spaced relation and depending substantially vertically downward beneath said table top; a base having a pair of vertically disposed pedestals adapted to slidably receive said support columns therein, said pedestals each being formed of a single sheet of material which is folded substantially U-shaped so as to form a cavity therein for receiving a portion of a screw drive assembly, the side walls of said pedestals each being angularly tapered inwardly from the top to the bottom thereof and having a closure plate affixed thereto so as to close said cavity therebetween to conceal said screw drive assembly therein, and a horizontally disposed box-like structure, the ends thereof being affixed between said side walls of said pedestals, said strut having a portion of the operating means for said screw drive assemblies retained and protectively concealed therein, alignment means comprising alignment bars affixed respectively to the opposite sides of each of said support columns and pair of guide bars affixed to said pedestals so as to slidably receive respective ones of said alignment bars therebetween for maintaining said support columns in vertical alignment; a screw drive assembly in each of said pedestals and affixed to said support columns for vertically adjusting the height thereof; and means for operating said screw drive assemblies.

References Cited

UNITED STATES PATENTS 1,173,283   2/1916   Leethem _____ 108—147 X

JAMES T McCALL, *Primary Examiner.*